Oct. 9, 1923.
L. H. DEBS
BAKING PANS
Filed Feb. 13, 1922
1,470,274
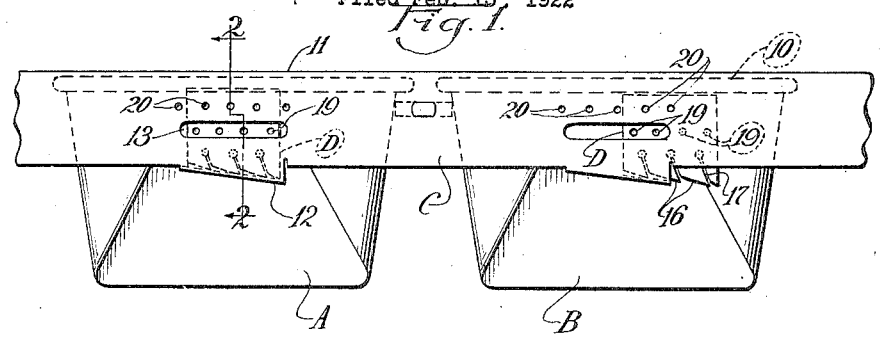
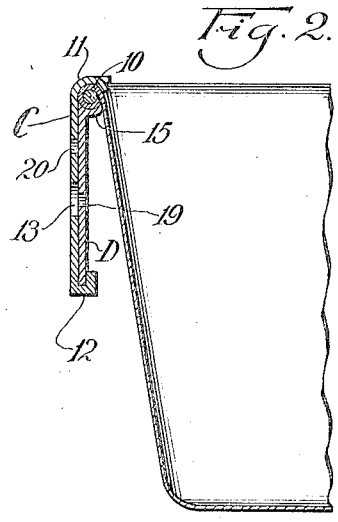
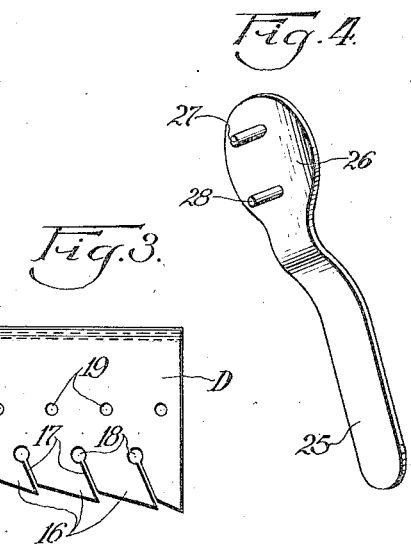
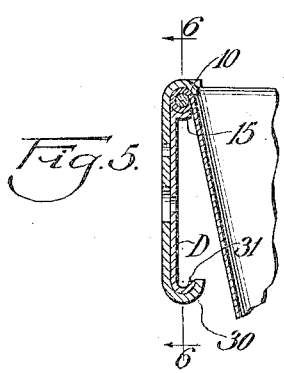
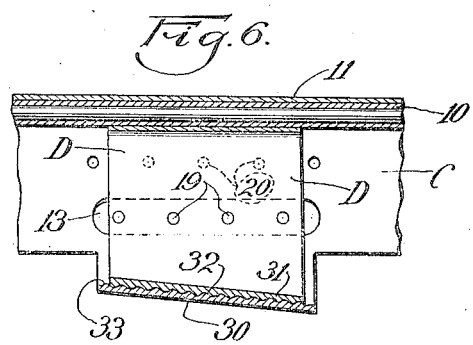
Inventor
Louis H. Debs.

Patented Oct. 9, 1923.

1,470,274

UNITED STATES PATENT OFFICE.

LOUIS H. DEBS, OF CHICAGO, ILLINOIS, ASSIGNOR OF ONE-HALF TO ALBERT COHN, OF CHICAGO, ILLINOIS.

BAKING PAN.

Application filed February 13, 1922. Serial No. 536,325.

*To all whom it may concern:*

Be it known that I, LOUIS H. DEBS, a citizen of the United States, residing at Chicago, in the county of Cook and State of Illinois, have invented certain new and useful Improvements in Baking Pans, of which the following is a specification.

This invention relates to a multiple baking pan the constituent parts of which are connected by certain novel and improved means.

It is a primary object of my invention to provide for the several pans a connection which will permit of each pan being individually removed, whenever desired; and a connection which will be secure and non-obstructive so that the baking pan unit may be handled without liability of its several connecting parts being brought into contact with any surrounding objects. Other purposes and uses of the invention will hereinafter appear from the specification and claims, and from the accompanying drawing wherein is represented a preferred embodiment thereof in the manner following:

Figure 1 is an end elevation of two pans arranged side by side to form part of a unit, the connecting means therebetween being clearly shown;

Fig. 2 is an enlarged transverse section taken on line 2—2 of Fig. 1;

Fig. 3 is a side elevation of the wedge element per se;

Fig. 4 shows in perspective a tool that is adapted to operate the wedge;

Fig. 5 is a view similar to Fig. 2 showing a modified form of connection; and

Fig 6 is a longitudinal section taken on line 6—6 of Fig. 5.

The two pans A and B shown in Fig. 1 are similar to others that are arranged side by side in a row to constitute a unit for convenience in handling. Each pan may be formed, as is customary, with an outturned wire edge 10, the contour of which is generally circular. To secure the pans together in unitary relation I make use of a frame which includes a connecting strap C arranged adjacent each end of the several pans, the upper edge of this strap, or desired portions thereof, being bent laterally as at 11 to provide a flange adapted to overlie each pan edge. Along its lower edge at places adjacent each pan this strap is bent around toward the pan to provide a channeled guideway 12 (see Fig. 2), that is slightly inclined upwardly toward the pan edge. In the body of the strap above the guideway I provide an open slot 13 for purposes which will presently appear.

Associated with the pans and strap so formed are wedge elements D each in the form of a plate whose upper edge is bent over to provide a shoulder 15 adapted to seat against the lower side of the pan edge (see Fig. 2). This shoulder, as well as the strap flange 11, may be slightly curved, if desired, to better grip the pan edge, but this expedient may be regarded as optional. The bottom wedge edge is provided with teeth 16 each obliquely disposed, in relation to the shoulder 15 as well as to the guideway, 12. The several teeth are separated from each other by slits 17 which also are obliquely disposed, each slit terminating at its inner end in an enlarged opening 18 by which construction I enhance the yieldability of each tooth when pressure is applied thereto. Elsewhere in the wedge element are a plurality of holes 19, preferably spaced equidistantly, and adapted to align with the strap slot 13. Other openings 20 are also provided in the strap (see Fig. 1), the purpose of which will presently appear.

In operation, the several pans are arranged in a row, and thereafter the straps are applied in place with the flanges 11 overlying the proximate edges of the pans. Between the pans these flanges may be either interrupted or be given a right angled bend, to allow the bent edges of the straps elsewhere to rest squarely upon each pan edge. A wedge element D is next inserted in each channeled guideway, its initial position being about as indicated in connection with pan B of Fig. 1. To advance the wedge, a tool, such as is shown in Fig. 4, may to advantage be employed, this tool consisting of a handle 25 connected with a head 26 from which project two pins 27 and 28 in spaced relation. One of these pins may be journaled in a strap opening 20 and the other engage any one of the wedge openings 19, following which the tool is turned after the manner of a lever, to force the wedge along upon the inclined guideway 12. The effect of this movement is to draw the strap tightly down upon the pan edges and also to force each wedge up tightly against the under side of the same edges. As the wedge is advanced, the increasing pressure will result in its teeth 16 bending slightly, but always engaging the guideway with its pointed ends. The teeth will accordingly tend to bite into the guideway of the strap, and thus oppose return movement with a conseqent diminution of wedging pressure. If at any time it is desired to disconnect any one or more of the pans from the unit, the tool shown in Fig. 4 may be again employed to facilitate the removal of the necessary wedge elements.

In Figs 5 and 6 I have shown a very similar construction, its several parts being designated by like reference numerals, wherever the same are applicable. In this construction, however, the guideway of the strap is bent around as at 30 in a generally semi-circular contour, and engaging therewithin is a similar flanged edge 31 formed on the lower edge of the wedge element. In lieu of spring teeth to oppose return movement of the wedge, serrations 32 and 33 are provided on the engaging faces of the wedge and strap respectively, the effect being to maintain the wedge element in any given position of adjustment unless forcibly shifted therefrom. In all other respects, the construction of Figs. 5 and 6 follows that elsewhere shown.

The construction herein set forth is advantageous in that the strap and wedge elements may be produced by a very simple mechanical process so as to require only a small expense in manufacture. In addition, only a minimum number of parts are required, and these are so related that no element protrudes beyond the outer face of the strap which is connected to the pan edges in the manner described. This is important because in handling the pan unit, no damage can result from contact with other units or fixed objects such as might occur through the use of connecting elements which project beyond the outer strap face, and it is further important because such units may be placed one adjacent another without interengagement such as to render difficult their independent handling.

I claim:

1. The combination with a plurality of pans arranged side by side, each having an outturned edge, of means for connecting the several pans in unitary relation comprising a strap from which portions are laterally bent to provide hooks each adapted to overlie the edge of one pan, and from which other portions are laterally bent in the same direction to provide guideways which face the pan edges in inclined relation thereto, and a plurality of wedge elements, one adapted to slide within each guideway, and to present a portion of itself beneath the edge of the proximate pan to thereby maintain the strap hook in engaging relation therewith, substantially as described.

2. The combination with a plurality of pans arranged side by side, each having an outturned edge, or means for connecting the several parts in unitary relation including a strap having portions of itself bent to overlie an edge of each pan, and other portions of itself bent to provide an inclined guideway which faces the proximate pan edge, and a wedge element slidably arranged in the guideway adapted to engage with the underside of the pan edge, the wedge element being formed with a plurality of teeth, each yieldable independently of the others, and adapted to present a pointed end in engagement with the guideway, substantially as described.

3. The combination with a plurality of pans arranged side by side, each having an outturned edge, of means for connecting the several pans in untary relation, comprising two sets of elements, one adapted to overlie the edges of the several pans and the other to underlie an edge of a single pan and to engage the same with a variable pressure, the two sets of elements being yieldably interconnected, substantially as described.

4. The combination with a plurality of pans arranged side by side, each having an outturned edge, of means for connecting the several pans in unitary relation comprising two sets of elements, one adapted to overlie the edges of the several pans and the other to underlie an edge of a single pan, the latter elements being disposed behind the others and movable toward and from the pan edge, there being openings through the outer element through which the movable elements may be operated to position, substantially as described.

5. In combination with a plurality of pans arranged side by side, each having an outturned edge, of means adapted for detachable connection with each pan including a strap arranged lengthwise of the pan row, and having portions of itself overlying the proximate edge of each pan, and a plurality of other means carried by the strap, one between itself and each pan adapted to engage the under side of the proximate pan edge with a variable pressure, substantially as described.

6. The combination of a plurality of pans arranged side by side, each having an outturned edge, of means for connecting the several pans in unitary relation comprising a plurality of elements, one arranged adjacent the under side of an edge of each pan, and means providing a mounting in which all of said elements may be moved toward or from their associated pan edges, said means extending along one side of the pan row to the outside of each movable element and having a portion of itself extended laterally to overlie each pan edge, substantially as described.

7. The combination with a pan having an outturned edge of handling means therefor adapted to overlie said edge and to extend downwardly along one pan side, and a plurality of other means movably carried on the inner side of the first means, each of said movable means being adapted to underlie said pan edge and to engage therewith with a variable pressure, substantially as described.

8. The combination with a plurality of baking pans arranged side by side, each having an outturned edge, of means for connecting the several pans in unitary relation comprising an element having a portion of itself adapted to overlie the edge of each pan, and a plurality of other elements each adapted to underlie an edge of each pan and be engaged with the first element, substantially as described.

9. The combination with a plurality of pans arranged side by side, each having an outturned edge, of means for connecting the several pans in unitary relation comprising an element having a portion of itself adapted to embrace the upper side of each pan edge, and a plurality of second elements, one adapted to engage the under side of the edge of each pan and to connect slidingly with the first element, substantially as described.

10. The combination with a pan having an outturned round edge, of handling means connecting therewith comprising an element having a laterally curved portion adapted to hook over the pan edge, and a second element slidably engaged with the first having a lateral shoulder in which the under side of the pan edge may seat, substantially as described.

LOUIS H. DEBS.

Witness:
EPHRAIM MANNING.